United States Patent [19]
D'Sidocky et al.

[11] Patent Number: 5,985,963
[45] Date of Patent: Nov. 16, 1999

[54] RUBBER COMPOUND CONTAINING A HYDRATED THIOSULFATE AND A BISMALEIMIDE

[75] Inventors: Richard Michael D'Sidocky, Ravenna; Leonard James Reiter; Lewis Timothy Lukich, both of Akron; Leighton Randolph Spadone, South Euclid, all of Ohio

[73] Assignee: The Goodyear Tire & Rubber Company, Akron, Ohio

[21] Appl. No.: 08/923,383

[22] Filed: Sep. 3, 1997

[51] Int. Cl.$^6$ ............... C08K 5/34; C08K 3/10; C08K 3/30
[52] U.S. Cl. ............ 524/105; 524/413; 524/419; 524/502
[58] Field of Search ................ 524/105, 413, 524/419, 502

[56] References Cited

U.S. PATENT DOCUMENTS

| | | | |
|---|---|---|---|
| 1,893,477 | 12/1933 | Frans Cornelius Van Heurn | 525/344 |
| 4,933,385 | 6/1990 | Yamamoto et al. | 524/105 |
| 4,960,833 | 10/1990 | Nagasaki et al. | 525/329.3 |
| 5,328,636 | 7/1994 | Maly et al. | 252/182.17 |
| 5,594,052 | 1/1997 | D'Sidocky et al. | 524/83 |
| 5,616,655 | 4/1997 | D'Sidocky et al. | 525/342 |

FOREIGN PATENT DOCUMENTS

| | | | |
|---|---|---|---|
| 0345825 | 12/1985 | European Pat. Off. | C08K 5/34 |
| 0564966 | 3/1993 | European Pat. Off. | C08L 21/00 |
| 0599643 | 11/1993 | European Pat. Off. | B60C 1/00 |
| 0751178 | 6/1996 | European Pat. Off. | C08K 5/47 |
| 1060639 | 4/1982 | U.S.S.R. | C08L 9/00 |
| 1249036 | 12/1984 | U.S.S.R. | C08L 9/00 |

OTHER PUBLICATIONS

Yu.N. Nikitin et al, Vulcanization of nitrile rubber by sulphides and thiosulphates of alkali and alkaline earth metals, International Polymer Science and Technology, vol. 2, No. 6 (1975).

Fritz Ephraim, Inorganic chemistry, pp. 579–585 (1954).

Abstract for JP 03056544, Jul. 25, 1989.

Abstract for EP 765903 A2, Sep. 29, 1995.

A.S. Prashchikina, et al, Kauchuk i Rezina, No. 7, (1979), p. 14.

*Primary Examiner*—Kriellion Sanders
*Attorney, Agent, or Firm*—Bruce J Hendricks

[57] ABSTRACT

This invention relates to the discovery that the combination of a hydrated thiosulfate and a bismaleimide compound provides for excellent final rubber vulcanizate physical properties including improved adhesion to aramid reinforcement.

7 Claims, No Drawings

RUBBER COMPOUND CONTAINING A HYDRATED THIOSULFATE AND A BISMALEIMIDE

BACKGROUND OF THE INVENTION

Aramid cord has found a position as a tire reinforcing material for tire casings and belts based on its exceptional properties related to tire performance. For example, its high modulus and strength characteristics contribute to reduced tire weight, lower running temperatures, lower rolling resistance, improved tread wear, improved handling and improved fatigue resistance. The challenge aramid cord faces as a reinforcing agent for tire applications is adhesion of the cord-rubber composite (see "Radial Truck Tire Aramid Reinforcement," paper 45, 126th ACS Rubber Division Meeting, Denver, Colo., Oct. 23–26, 1984; "Aramid Fibers and Adhesion to Elastomers: Applications and Performance," Rubber World 215 (2) page 30 (1996); "Fiber Reinforcement in Tires: An Overview," Tire Technology International, (1993) page 28).

The present invention relates to a sulfur-vulcanized rubber compound comprising a sulfur-vulcanizable rubber, sodium thiosulfate pentahydrate and a bismaleimide which provides improved adhesion between aramid cord and the rubber composition of this invention.

SUMMARY OF THE INVENTION

The present invention relates to a rubber composition comprising: (a) a rubber, (b) a hydrated thiosulfate and (c) a bismaleimide.

DETAILED DESCRIPTION OF THE INVENTION

There is disclosed a rubber composition comprising:
(a) a rubber selected from the group consisting of natural rubber, a rubber derived from a diene monomer and mixture thereof;
(b) from about 0.05 to about 5.0 phr of a hydrated thiosulfate; and
(c) from about 0.1 to about 10.0 phr of a bismaleimide compound of the general formula:

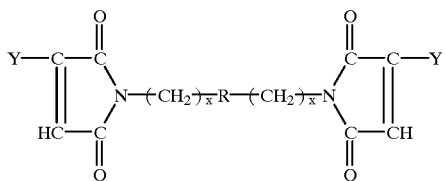

(I)

wherein R is divalent and is selected from the group consisting of acyclic aliphatic groups having from about 2 to 16 carbon atoms, cyclic aliphatic groups having from about 5 to 20 carbon atoms, aromatic groups having from about 6 to 18 carbon atoms, and alkylaromatic groups having from about 7 to 24 carbon atoms, wherein these divalent groups may contain a hetero atom selected from O, N and S; X is 0 or an integer of from 1 to 3 and Y is hydrogen or —$CH_3$.

The term "phr" as used herein, and according to conventional practice, refers to "parts by weight of a respective material per 100 parts by weight of rubber, or elastomer".

The first essential component of the present invention is the hydrated thiosulfate. The hydrated thiosulfate that is used may vary. Representative examples of such hydrated thiosulfates include $BaS_2O_3.H_2O$, $K_2S_2O_3.1.5\ H_2O$, $CaS_2O_3.6H_2O$, $MgS_2O_3.6H_2O$, $NiS_2O_3.6H_2O$, $CoS_2O_3.6H_2O$, $SrS_2O_3.5H_2O$, $Na_2S_2O_3.5H_2O$, $MnS_2O_3.5H_2O$, $Li_2S_2O_3.3H_2O$ and $CdS_2O_3.2H_2O$. Preferably, the hydrated thiosulfate is $Na_2S_2O_3.5H_2O$.

The hydrated thiosulfate used in the present invention may be added to the rubber by any conventional technique such as on a mill or in a Banbury. The amount of hydrated thiosulfate may vary widely depending on the type of rubber and other compounds present in the vulcanizable composition. Generally, the amount of hydrated thiosulfate is used in a range of from about 0.05 to about 5.0 phr with a range of 0.1 to about 1.0 phr being preferred.

For ease in handling, the hydrated thiosulfate may be used per se or may be deposited on suitable carriers. Examples of carriers which may be used in the present invention include silica, carbon black, alumina, silica gel and calcium silicate.

The bismaleimide is the second essential component in the claimed invention. The bismaleimide is generally present in an amount of from about 0.1 to 10.0 phr. Preferably, the bismaleimide is present in an amount ranging from about 0.5 to about 5.0 phr.

Representative of the bismaleimides of formula I and which may be used in the present invention include N,N'-ethylenebismaleimide, N,N'-hexamethylenebismaleimide, N,N'-dodecamethylenebismaleimide, N,N'-(2,2,4-trimethylhexamethylene)bismaleimide, N,N'-(oxydipropylene)bismaleimide, N,N'-(aminodipropylene) bismaleimide, N,N'-(ethylenedioxydipropylene) bismaleimide, N,N'(1,4-cyclohexylene)bismaleimide, N,N'-(1,3-cyclohexylene)bismaleimide, N,N'-(methylene-1,4-dicyclohexylene)bismaleimide, N,N'-(isopropylidene-1,4-dicyclohexylene)bismaleimide, N,N'-(oxy-1,4-dicyclohexylene)bismaleimide, N,N'-(m-phenylene) bismaleimide, N,N'-p-(phenylene)bismaleimide, N,N'-(o-phenylene)bismaleimide, N,N'-(1,3-naphthylene) bismaleimide, N,N'-(1,4-naphthylene)bismaleimide, N,N'-(1,5-naphthylene)bismaleimide, N,N-(3,3'-dimethyl-4,4'-diphenylene)bismaleimide, N,N'-( 3,3-dichloro-4,4'-biphenylene)bismaleimide, N,N'-(2,4-pyridyl) bismaleimide, N,N'-(2,6-pyridyl)bismaleimide, N,N'-(m-tolylene)bismaleimide, N,N'-(p-tolylene)bismaleimide, N,N'-(4,6-dimethyl-1,3-phenylene)bismaleimide, N,N'-(2,3-dimethyl-1,4-phenylene)bismaleimide, N,N'-(4,6-dichloro-1,3-phenylene)bismaleimide, N,N'-(5-chloro-1,3-phenylene)bismaleimide, N,N'-(5-hydroxy-1,3-phenylene) bismaleimide, N,N'-(5-methoxy-1,3-phenylene) bismaleimide, N,N'-(m-xylylene)bismaleimide, N,N'-(p-xylylene)bismaleimide, N,N'-(methylenedi-p-phenylene) bismaleimide, N,N'-(isopropylidenedi-p-phenylene) bismaleimide, N,N'-(oxydi-p-phenylene)bismaleimide, N,N'-(thiodi-p-phenylene)bismaleimide, N,N'-(dithiodi-p-phenylene)bismaleimide, N,N'-(sulfodi-p-phenylene) bismaleimide, N,N'-(carbonyldi-p-phenylene)bismaleimide, α,α-bis-(4-maleimidophenyl)-meta-diisopropylbenzene, α,α-bis-(4-p-phenylene) bismaleimide, N,N'-m-xylylene-bis-citraconic imide and α,α-bis-(4-maleimidophenyl)-para-diisopropylbenzene. The preferred bismaleimide is N,N'-(m-phenylene)bismaleimide.

Examples of rubbers for use in the present invention include substituted and unsubstituted, saturated and unsaturated, natural and synthetic polymers. The natural polymers include natural rubber in its various forms, e.g., pale crepe and smoked sheet, and balata and gutta percha. The synthetic polymers are derived from a diene monomer and include those prepared from a single monomer (homopolymer) or a mixture of two or more copolymerizable monomers (copolymer) when the monomers are combined in the random distribution or block form. The monomers may be substituted or unsubstituted and may possess one or more double bonds, conjugated and nonconjugated dienes and monoolefins, including cyclic and acyclic monoolefins, especially vinyl and vinylidene monomers. Examples of conjugated dienes are 1,3-butadiene, isoprene, chloroprene, 2-ethyl-1,3-butadiene, 2,3-dimethyl-1,3-butadiene and piperylene. Examples of nonconjugated dienes are 1,4-pentadiene, 1,4-hexadiene, 1,5-hexadiene, dicyclopentadiene, 1,5-cyclooctadiene, and ethyldiene norbornene. Examples of acyclic monoolefins are ethylene, propylene, 1-butene, isobutylene, 1-pentene and 1-hexene. Examples of cyclic monoolefins are cyclopentene, cyclohexene, cycloheptene, cyclooctene and 4-methyl-cyclooctene. Examples of vinyl monomers are styrene, acrylonitrile, acrylic acid, ethylacrylate, vinyl chloride, butylacrylate, methyl vinyl ether, vinyl acetate and vinyl pyridine. Examples of vinylidene monomers are alpha-methylstyrene, methacrylic acid, methyl methacrylate, itaconic acid, ethyl methacrylate, glycidyl methacrylate and vinylidene chloride. Representative examples of the synthetic polymers used in the practice of this invention are polychloroprene homopolymers of a conjugated 1,3-diene such as isoprene and butadiene, and in particular, polyisoprenes and polybutadienes having essentially all of their repeat units combined in a cis-1,4-structure; and copolymers of a conjugated 1,3-diene such as isoprene and butadiene with up to 50 percent by weight of at least one copolymerizable monomer, including ethylenically unsaturated monomers such as styrene or acrylonitrile; and butyl rubber, which is a polymerization product of a major proportion of a monoolefin and a minor proportion of a diolefin such as butadiene or isoprene. The rubber may be emulsion polymerized or solution polymerized.

The preferred rubbers which may be used with the present invention are cis-1,4-polyisoprene (natural or synthetic), polybutadiene, polychloroprene and the copolymers of isoprene and butadiene, copolymers of acrylonitrile and butadiene, copolymers of acrylonitrile and isoprene, copolymers of styrene, butadiene and isoprene, copolymers of styrene and butadiene and blends thereof.

As known to one skilled in the art, in order to cure a rubber stock, one needs to have a sulfur vulcanizing agent. Examples of suitable sulfur vulcanizing agents include elemental sulfur (free sulfur) or a sulfur donating vulcanizing agent, for example, an amine disulfide, polymeric polysulfide or sulfur olefin adducts. Preferably, the sulfur vulcanizing agent is elemental sulfur. The amount of sulfur vulcanizing agent will vary depending on the components of the rubber stock and the particular type of sulfur vulcanizing agent that is used. The sulfur vulcanizing agent is generally present in an amount ranging from about 0.5 to about 6 phr. Preferably, the sulfur vulcanizing agent is present in an amount ranging from about 0.75 phr to about 4.0 phr.

Conventional rubber additives may be incorporated in the rubber stock of the present invention. The additives commonly used in rubber stocks include fillers, plasticizers, waxes, processing oils, retarders, antiozonants, antioxidants and the like. The total amount of filler that may be used may range from about 30 to about 150 phr, with a range of from about 45 to about 100 phr being preferred. Fillers include clays, calcium carbonate, calcium silicate, titanium dioxide and carbon black. Representatives carbon blacks that are commonly used in rubber stocks include N-326, N-330, N-472, N-660, N-754, N-762, N-765 and N-990. Plasticizers are conventionally used in amounts ranging from about 2 to about 50 phr with a range of about 5 to about 30 phr being preferred. The amount of plasticizer used will depend upon the softening effect desired. Examples of suitable plasticizers include aromatic extract oils, petroleum softeners including asphaltenes, pentachlorophenol, saturated and unsaturated hydrocarbons and nitrogen bases, coal tar products, cumarone-indane resins and esters such as dibutylphthalate and tricresol phosphate. Common waxes which may be used include paraffinic waxes and microcrystalline blends. Such waxes are used in amounts ranging from about 0.5 to 3 phr. Materials used in compounding which function as an accelerator-activator includes metal oxides such as zinc oxide and magnesium oxide which are used in conjunction with acidic materials such as fatty acid, for example, stearic acid, oleic acid, murastic acid, and the like. The amount of the metal oxide may range from about 1 to about 14 phr with a range of from about 2 to about 8 phr being preferred. The amount of fatty acid which may be used may range from about 0 phr to about 5.0 phr with a range of from about 0 phr to about 2 phr being preferred.

Siliceous pigments may be used in the rubber compound applications of the present invention, including pyrogenic and precipitated siliceous pigments (silica), although precipitate silicas are preferred. The siliceous pigments preferably employed in this invention are precipitated silicas such as, for example, those obtained by the acidification of a soluble silicate, e.g., sodium silicate. Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930). The silica may also be typically characterized by having a dibutylphthalate (DBP) absorption value in a range of about 100 to about 400, and more usually about 150 to about 300. The silica might be expected to have an average ultimate particle size, for example, in the range of 0.01 to 0.05 micron as determined by the electron microscope, although the silica particles may be even smaller, or possibly larger, in size. Various commercially available silicas may be considered for use in this invention such as, only for example herein, and without limitation, silicas commercially available from PPG Industries under the Hi-Sil™ trademark with designations 210, 243, etc; silicas available from Rhone-Poulenc, with, for example, designations of Z1165MP™ and Z165GR™ and silicas available from Degussa AG with, for example, designations VN2™ and VN3™, etc. The PPG Hi-Sil silicas are currently preferred.

In those instances where silica is added to the rubber, a sulfur containing organosilicon compound is typically added as a silica coupling agent. Examples of suitable sulfur containing organosilicon compounds are of the formula:

Z-Alk-S$_n$-Alk-Z (II)

in which Z is selected from the group consisting of

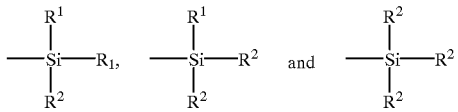

where R$^1$ is an alkyl group of 1 to 4 carbon atoms, cyclohexyl or phenyl;

R$^2$ is alkoxy of 1 to 8 carbon atoms, or cycloalkoxy of 5 to 8 carbon atoms;

Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis(trihexoxysilylpropyl) disulfide, 3,3'-bis(tri-2"-ethylhexoxysilylpropyl) trisulfide, 3,3'-bis(triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis(trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec.butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis(dimethoxymethylsilylpentyl) trisulfide, 3,3'-bis(trimethoxysilyl-2-methylpropyl) tetrasulfide, 3,3'-bis(dimethoxyphenylsilyl-2-methylpropyl) disulfide.

The preferred sulfur containing organosilicon compounds are the 3,3'-bis(trimethoxy or triethoxy silylpropyl) sulfides. The most preferred compound is 3,3'-bis(triethoxysilylpropyl) tetrasulfide. Therefore as to formula I, preferably Z is

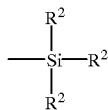

where $R^2$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 3 to 5 with 4 being particularly preferred.

The amount of the sulfur containing organosilicon compound of Formula II in a rubber composition will vary depending on the level of silica that is used. Generally speaking, the amount of the compound of Formula II will range from 0.01 to 1.0 parts by weight per part by weight of the silica. Preferably, the amount will range from 0.05 to 0.4 parts by weight per part by weight of the silica.

A class of compounding materials known as scorch retarders are commonly used. Phthalic anhydride, salicylic acid, sodium acetate and N-cyclohexyl thiophthalimide are known retarders. Retarders are generally used in an amount ranging from about 0.1 to 0.5 phr.

Vulcanization of the rubber composition of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air or in a salt bath.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The most preferred sulfenamides are compounds of the general formula:

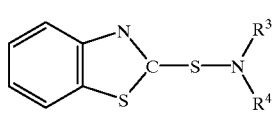

(III)

wherein $R^3$ is selected from the group consisting of hydrogen, acyclic aliphatic groups having from about 1 to 10 carbon atoms, and cyclic aliphatic groups having from about 5 to 10 carbon atoms; and $R^4$ is selected from the group consisting of cyclic aliphatic groups having from about 5 to 10 carbon atoms and a mercaptobenzothiazolyl group of the formula:

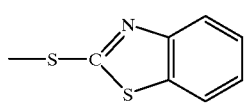

Representative of the sulfenamide compounds of the above formula and which may be used in the present invention include N-cyclohexyl-2-benzothiazylsulfenamide, N-t-butyl-2-benzothiazylsulfenamide, N,N-dicyclohexyl-2-benzothiazylsulfenamide, N-isopropyl-2-benzothiazylsulfenamide, and N-t-butylbis-(2-benzothiazylsulfen)amide. Preferably, the sulfenamide compound is N-cyclohexyl-2-benzothiazylsulfenamide.

In situ resins may be formed in the rubber stock and involve the reaction of cashew nut oil modified novolak-type phenolic resin and a methylene donor. The term "methylene donor" is intended to mean a compound capable of reacting with the cashew nut oil modified novolak-type phenolic resin and generate the resin in-situ. Examples of methylene donors which are suitable for use in the present invention include hexamethylenetetramine, hexaethoxymethylmelamine, hexamethoxymethylmelamine, lauryloxymethylpyridinium chloride, ethoxymethylpyridinium chloride, trioxan hexamethoxymethylmelamine, the hydroxy groups of which may be esterified or partly esterified, and polymers of formaldehyde such as paraformaldehyde. In addition, the methylene donors may be N-substituted oxymethylmelamines, of the general formula:

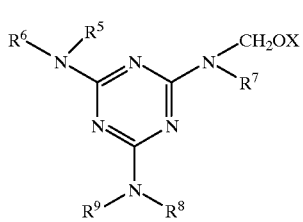

(IV)

wherein X is an alkyl having from 1 to 8 carbon atoms, $R^5$, $R^6$, $R^7$ $R^8$ and $R^9$ are individually selected from the group consisting of hydrogen, an alkyl having from 1 to 8 carbon atoms, the group —CH$_2$OX or their condensation products. Specific methylene donors include hexakis-(methoxymethyl)melamine, N,N',N"-trimethyl/N,N',N"-trimethylolmelamine, hexamethylolmelamine, N,N',N"-dimethylolmelamine, N-methylolmelamine, N,N'-dimethylolmelamine, N,N',N"-tris(methoxymethyl)melamine and N,N'N"-tributyl-N,N',N"-trimethylol-melamine. The N-methylol derivatives of melamine are prepared by known methods.

The amount of methylene donor that is present in the rubber stock may vary. Typically, the amount of methylene donor that is present will range from about 0.1 phr to 10.0 phr. Preferably, the amount of methylene donor ranges from about 2.0 phr to 5.0 phr.

Conventionally, antioxidants and sometimes antiozonants, hereinafter referred to as antidegradants, are added to rubber stocks. Representative antidegradants include monophenols, bisphenols, thiobisphenols, polyphenols, hydroquinone derivatives, phosphites, thioesters, naphthyl amines, diphenyl-p-phenylenediamines, diphenylamines and other diaryl amine derivatives, para-phenylenediamines, quinolines and mixtures thereof. Specific examples of such antidegradants are disclosed in The Vanderbilt Rubber Handbook (1990), pages 282–286. Antidegradants are generally used in amounts from about 0.25 to about 5.0 phr with a range of from about 1.0 to about 3.0 phr being preferred.

When the compound of the present invention is used as a wire coat or bead coat for use in a tire, the compound generally contains an organo-cobalt compound which serves as a wire adhesion promoter. Any of the organo-cobalt compounds known in the art to promote the adhesion of rubber to metal may be used. Thus, suitable organo-cobalt compounds which may be employed include cobalt salts of fatty acids such as stearic, palmitic, oleic, linoleic and the like; cobalt salts of aliphatic or alicyclic carboxylic acids having from 6 to 30 carbon atoms; cobalt chloride, cobalt naphthenate; cobalt carboxylate and an organo-cobalt-boron complex commercially available under the designation Manobond C from Wyrough and Loser, Inc, Trenton, N.J. Manobond C™ is believed to have the structure:

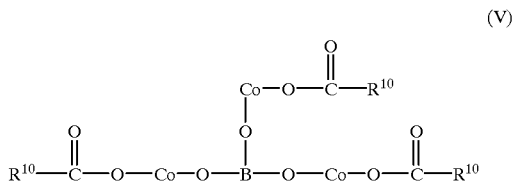

(V)

in which $R^{10}$ is an alkyl group having from 9 to 12 carbon atoms.

Amounts of organo-cobalt compound which may be employed depend upon the specific nature of the organo-cobalt compound selected, particularly the amount of cobalt metal present in the compound. Since the amount of cobalt metal varies considerably in organo-cobalt compounds which are suitable for use, it is most appropriate and convenient to base the amount of the organo-cobalt compound utilized on the amount of cobalt metal desired in the finished stock composition. Accordingly, it may in general be stated that the amount of organo-cobalt compound present in the stock composition should be sufficient to provide from about 0.01 percent to about 0.35 percent by weight of cobalt metal based upon total weight of the rubber stock composition with the preferred amounts being from about 0.03 percent to about 0.2 percent by weight of cobalt metal based on total weight of skim stock composition.

The rubber compounds of the present invention may also contain a cure activator. A representative cure activator is methyl trialkyl ($C_8$–$C_{10}$) ammonium chloride commercially available under the trademark Adogen® 464 from Sherex Chemical Company of Dublin, Ohio. The amount of activator may be used in a range of from 0.05 to 5 phr.

The mixing of the rubber compound can be accomplished by methods known to those having skill in the rubber mixing art. For example, the ingredients are typically mixed in at least two stages, namely at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) of the preceding non-productive mix stage(s). The hydrated thiosulfate may be mixed in one or more non-productive mix stages or in the productive mix stage. The sulfur, bismaleimide and accelerator compound is generally mixed in the productive mix stage. The terms "non-productive" and "productive" mix stages are well known to those having skill in the rubber mixing art.

The rubber composition of this invention can be used for various purposes. For example, it can be used for various tire compounds. Such pneumatic tires can be built, shaped, molded and cured by various methods which are known and will be readily apparent to those having skill in such art. Preferably, the rubber composition is used as a carcass compound, wire coat or bead coat. As can be appreciated, the tire may be a passenger tire, aircraft tire, truck tire and the like.

The present invention may be better understood by reference to the following examples in which the parts or percentages are by weight (phr) unless otherwise indicated.

EXAMPLE 1

Table I below shows the basic rubber compound that was used for all samples. The various additives were compounded using conventional rubber compounding techniques and the samples vulcanized by compression molding for 36 minutes at 150° C. Adhesion to aramid was evaluated using the Hot U-test procedure described in ASTM D4777-88. Adhesion is represented by the force required to pull an embedded cord through and out of a rubber block.

TABLE I

| Sample No. | Control 1 | Control 2 | Control 3 | 4 |
|---|---|---|---|---|
| Nonproductive | | | | |
| Rosin ester[1] | 4 | 4 | 4 | 4 |
| Resin[2] | 1 | 1 | 1 | 1 |
| Natural Rubber | 100 | 100 | 100 | 100 |
| Antioxidant | 2 | 2 | 2 | 2 |
| Peptizing Agent | 0.1 | 0.1 | 0.1 | 0.1 |
| Process Oil | 2 | 2 | 2 | 2 |
| Stearic Acid | 2 | 2 | 2 | 2 |
| Zinc Oxide | 6 | 6 | 6 | 6 |
| Silica | 5 | 5 | 5 | 5 |
| Coupling Agent[4] | 0.67 | 0.67 | 0.67 | 0.67 |
| Carbon Black[5] | 40 | 40 | 40 | 40 |
| Sodium Thiosulfate Pentahydrate | | | 0.3 | 0.3 |
| Productive | | | | |
| N,N'-(m-phenylene)bismaleimide | | 1.5 | | 1.5 |
| CBS[3] | 0.9 | 0.9 | 0.9 | 0.9 |
| Antioxidant | 1 | 1 | 1 | 1 |
| Tetrabenzylthiuram Disulfide | 0.1 | 0.1 | 0.1 | 0.1 |
| Sulfur | 1.5 | 1.5 | 1.5 | 1.5 |

[1]Hydrogenated methyl ester of rosin
[2]Bromomethyl alkylated phenolic resin
[3]N-cyclohexyl-2-benzothiazolesulfenamide
[4]50/50 by weight of carbon black/3,3'bis(triethoxysilylpropyl)tetrasulfide
[5]N347

Cure properties were determined using a Monsanto oscillating disc rheometer which was operated at a temperature of 150° C. and 100 cycles per minute. A description of oscillating disc rheometers can be found in the Vanderbilt Rubber Handbook edited by Robert O. Ohm (Norwalk, Conn., R. T. Vanderbilt Company, Inc., 1990), pages 554–557. The use of this cure meter and standardized values read from the curve are specified in ASTM D-2084. A typical cure curve obtained on an oscillating disc rheometer is shown on page 555 of the 1990 edition of the Vanderbilt Rubber Handbook.

In such an oscillating disc rheometer, compounded rubber samples are subjected to an oscillating shearing action of constant amplitude. The torque of the oscillating disc embedded in the stock that is being tested that is required to oscillate the rotor at the vulcanization temperature is measured. The values obtained using this cure test are very significant since changes in the rubber or the compounding recipe are very readily detected. It is obvious that it is normally advantageous to have a fast cure rate.

The following Table II reports cure properties that were determined from cure curves that were obtained for the rubber stocks that were prepared. These properties include a torque minimum (Min. Torque), a torque maximum (Max. Torque), minutes to 50 percent of the torque increase (t50), minutes to 90 percent of the torque increase (t90) and difference between the maximum torque and minimum torque (delta torque).

TABLE II

| Sample No. | Control 1 | Control 2 | Control 3 | 4 |
|---|---|---|---|---|
| Rheometer, 150° C., 1° Arc, 100 cpm | | | | |
| T50 (min) | 8 | 9.3 | 6.5 | 7.5 |
| T90 (min) | 10.5 | 12.8 | 9.0 | 10.5 |
| Min Torque (dNm) | 7.5 | 8.0 | 9.0 | 9.0 |
| Max Torque (dNm) | 34.0 | 39.0 | 34.0 | 39.0 |
| Delta Torque (dNm) | 26.5 | 31.0 | 25.0 | 30.0 |
| Hot U Cord Adhesion (ASTM D4777-88) | | | | |
| Aramid Cord (Newtons) | 156 | 138 | 128 | 194 |

Control 1 of Table II shows the aramid cord adhesion expected for a typical vulcanize containing the various additives of Table I. Baseline adhesion to aramid was established at 156 newtons. The adhesive composition of this invention (Sample 4) containing N,N'-(m-phenylene) bismaleimide in combination with sodium thiosulfate pentahydrate, when added to vulcanizate formula of Control 1, increased the aramid adhesion to 194 newtons, a 24.4 percent improvement. It is interesting to compare the effect of each component of this composition on aramid adhesion. Thus, using N,N'-(m-phenylene)bismaleimide alone (Control 2) actually was detrimental for aramid cord adhesion to the vulcanize formulation of Control 1 giving a drop in adhesion from 156 newtons (Control 1) to 138 newtons (Control 2). This represents an adhesion loss of 11.5 percent. When Control 2 containing N,N-(m-phenylene) bismaleimide is compared to the N,N'-(m-phenylene) bismaleimide/sodium thiosulfate pentahydrate composition of Sample 4, an adhesion deficiency of 40.6 percent is evident (adhesion dropped from 194 newtons to 138 newtons). Likewise, using sodium thiosulfate pentahydrate alone (Control 3) was also detrimental for aramid cord adhesion to the vulcanizate formulation of Table I giving a drop in adhesion from 156 newtons (Control 1) to 128 newtons (Control 3). This represents an adhesion loss of 17.9 percent. When Control 3 containing sodium thiosulfate pentahydrate is compared to the N,N'-(m-phenylene) bismaleimide/sodium thiosulfate pentahydrate composition of Sample 4, an adhesion deficiency of 51.6 percent is evident (adhesion dropped from 194 newtons to 128 newtons). This illustrates the unique and unexpected enhancement in aramid adhesion N,N'-(m-phenylene) bismaleimide in combination with sodium thiosulfate pentahydrate has versus these materials used alone.

What is claimed is:

1. A rubber compound comprising:

(a) a rubber selected from the group consisting of natural rubber, a rubber derived from a diene monomer and mixtures thereof;

(b) from about 0.05 to about 5.0 phr of a hydrated thiosulfate;

(c) from about 0.1 to about 10.0 phr of a bismaleimide compound of the general formula:

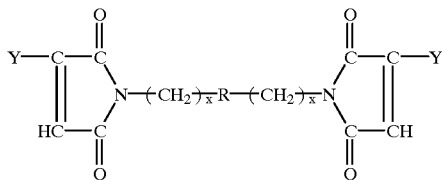 (I)

wherein R is a divalent acyclic aliphatic group having from about 2 to 16 carbon atoms, cyclic aliphatic group having from about 5 to 20 carbon atoms, aromatic group having from about 6 to 18 carbon atoms, or alkylaromatic group having from about 7 to 24 carbon atoms, wherein these divalent groups may contain a hetero atom selected from O, N and S; X is O or an integer of from 1 to 3 and Y is hydrogen or —$CH_3$.

2. The rubber compound of claim 1 wherein said rubber derived from a diene monomer is selected from the group consisting of natural rubber, synthetic cis-1,4-polyisoprene, polybutadiene, polychloroprene, copolymers of isoprene and butadiene, copolymers of acrylonitrile and butadiene, copolymers of acrylonitrile and isoprene, copolymers of styrene, butadiene and isoprene, copolymers of styrene and butadiene and blends thereof.

3. The rubber compound of claim 1 wherein said hydrated thiosulfate is selected from the group consisting of $BaS_2O_3 \cdot H_2O$, $K_2S_2O_3 \cdot 1.5 \ H_2O$, $CaS_2O_3 \cdot 6H_2O$, $MgS_2O_3 \cdot 6H_2O$, $NiS_2O_3 \cdot 6H_2O$, $CoS_2O_3 \cdot 6H_2O$, $SrS_2O_3 \cdot 5H_2O$, $Na_2S_2O_3 \cdot 5H_2O$, $MnS_2O_3 \cdot 5H_2O$, $Li_2S_2O_3 \cdot 3H_2O$ and $CdS_2O_3 \cdot 5H_2O$.

4. The method of claim 2 wherein said hydrated thiosulfate is $Na_2S_2O_3 \cdot 5H_2O$.

5. The rubber compound of claim 1 wherein said bismaleimide is selected from the group consisting of N,N'-ethylenebismaleimide, N,N'-hexamethylenebismaleimide, N,N'-(m-phenylene)bismaleimide, N,N'-(p-phenylene)bismaleimide, N,N'-(p-tolylene)bismaleimide, N,N'-(methylenedi-p-phenylene)-bismaleimide, N,N'-(oxydi-p-phenylene)bismaleimide, α,α-bis-(4-phenylene)bismaleimide, N,N'-m-xylylene-bis-citraconic imide and α,α-bis-(4-maleimidophenyl)-meta-diisopropylbenzene.

6. The rubber compound of claim 1 wherein a sulfur vulcanizing agent is present and is selected from the group consisting of elemental sulfur, an amine disulfide, polymeric polysulfide and sulfur olefin adducts.

7. The rubber compound of claim 1 in the form of a tire, hose, belt or shoe sole.

* * * * *